UNITED STATES PATENT OFFICE.

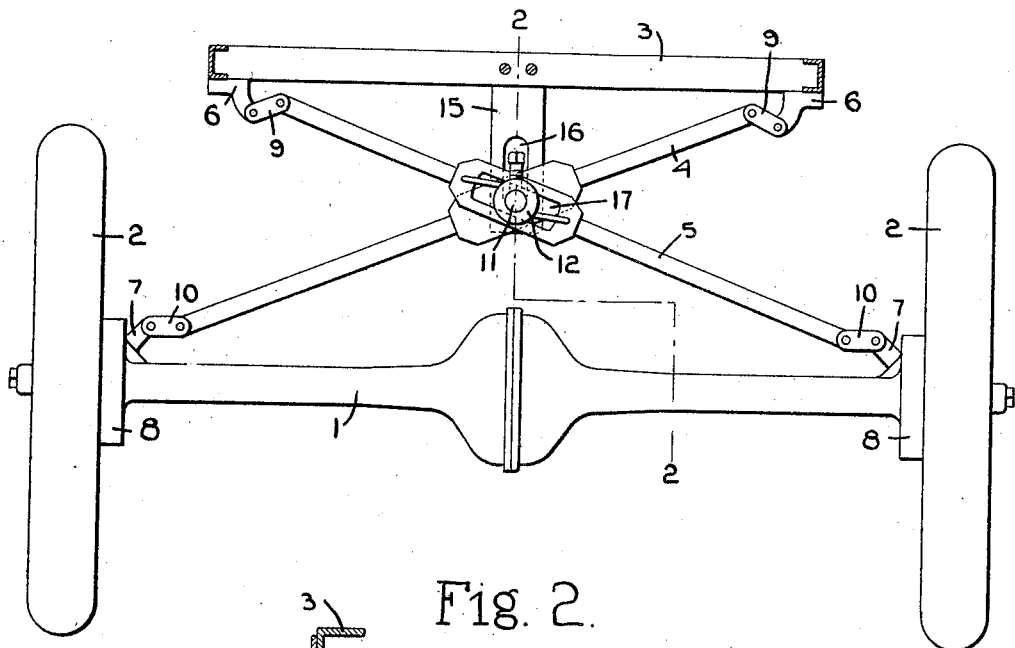
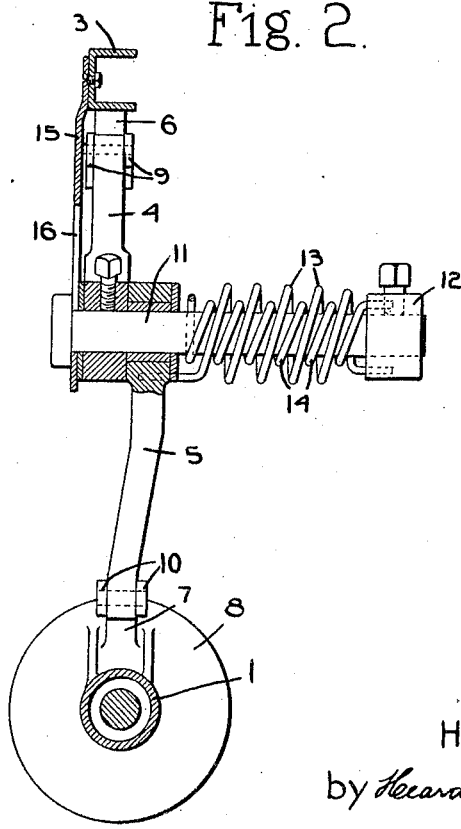

HERBERT E. SMITH, OF MANCHESTER, NEW HAMPSHIRE.

VEHICLE-SPRING.

1,392,974.  Specification of Letters Patent.  Patented Oct. 11, 1921.

Application filed April 4, 1921. Serial No. 458,251.

*To all whom it may concern:*

Be it known that I, HERBERT E. SMITH, a citizen of the United States, resident of Manchester, county of Hillsborough, State of New Hampshire, have invented an Improvement in Vehicle-Springs, of which the following description, in connection with the accompanying drawing, is a specification, like characters on the drawing representing like parts.

This invention relates to a spring suspension for vehicle bodies and has for its object to provide a novel form of spring suspension which is constructed so that the vehicle body will be maintained in a horizontal position regardless of the distribution of the load thereon, and further to provide a novel spring suspension which is constructed so that it will resist any side movements of the body and therefore hold the body from swaying.

Further objects of the invention are to improve spring suspensions for vehicles in various other ways all as will be more fully hereinafter set forth.

In order to give an understanding of my invention I have illustrated in the drawings a selected embodiment thereof which will now be described after which the novel features will be pointed out in the appended claims.

Figure 1 is a view showing my invention as applied for supporting the body of an automobile.

Fig. 2 is an enlarged section on the line 2—2, Fig. 1.

I have chosen herein to illustrate my invention as it might be employed in the body of an automobile but I wish to state that the invention is applicable for supporting other vehicle bodies than automobile bodies. I have also illustrated an arrangement of the invention by which a single spring device supports the rear end of an automobile body but I desire to state that this is merely an illustration of one embodiment of the invention and one way of using it and that the device is applicable to any other location without departing from the invention.

In the drawings 1 indicates the rear axle housing of an automobile and 2 the rear wheels. 3 indicates a portion of the chassis on which the body is mounted.

My improved spring suspension comprises two crossing members 4 and 5 each of which is pivotally connected at its upper end to the chassis 3 and is pivotally connected at its lower end to the rear axle housing. One of the lever members has a fulcrum pin extending therefrom on which the other lever pivots and a spring element is provided acting on the two members and tending to raise the upper ends thereof. When load is applied to the chassis the downward movement thereof tends to turn the levers relative to each other and this movement is resisted by the spring device.

The members 4 and 5 may be connected to the chassis and axle housing in any suitable way without departing from the invention. I have herein shown for this purpose brackets 6 secured to the chassis 3 and other brackets 7 supported on the axle housing, the bracket 7 preferably being carried directly by the brake drum 8. The upper end of each lever is connected to its bracket 6 through a link 9 and the lower end of each lever is connected to the bracket 7 through a link 10. The lever 4 has rigid therewith the fulcrum pin 11 which extends through a slot 17 in the lever 5. The spring element which yieldingly supports the load surrounds the pin 11 and is connected at one end thereto and at the other end is connected to the lever 5. Since the pin 11 is rigid with the lever 4 the effect is that of a spring having one end connected to the lever 4 and the other connected to the lever 5 and tending to move the levers relatively in a direction to elevate the upper ends thereof. Any suitable spring connection adapted to accomplish this purpose may be employed. A desirable construction is that herein shown wherein the pin 11 has a collar 12 fast thereon and wherein the spring element comprises two or more coil springs 13, 14 coiled about the pin 11 and secured at one end to the collar 12 and at the other end to the lever 5. I have herein shown the two coil springs as being of different sizes so that the coil spring 14 is received within the coil spring 13 but this is only one form of spring device which might be employed. The chassis 3 has a guiding plate 15 rigidly secured thereto and depending therefrom, said plate having a slot 16 through which the pin 11 extends. The purpose of this guide plate is to assist in holding the pin in proper position.

With this crossing arrangement of levers it will be impossible for one side of the chassis to move up or down relative to the other side and as a consequence the body will always be maintained level. Furthermore this form of spring suspension prevents the body from swaying laterally relative to the axle because any such lateral swaying movement will be resisted directly by the levers.

I claim.

1. In a spring suspension for vehicles, the combination with a vehicle body, of an axle, two crossing levers pivotally connected together, the upper end of each lever being pivoted to the vehicle body and the lower end of said levers being pivotally connected to the axle, one of the levers having a slot, a pin rigid with the other lever and extending through said slot, and a spring device acting on one lever and said pin and tending to turn the levers relative to each other in a direction to raise the upper ends thereof.

2. In a spring suspension for vehicles, the combination with a vehicle body, of an axle, two crossing levers each pivotally connected at its upper end to the body and at its lower end to the axle, a pin fixed to one lever and extending through a slot in the other lever, and a spring encircling said pin and having one end connected to said pin and the other end to the slotted lever, said spring operating to support yieldingly the load on the body.

In testimony whereof, I have signed my name to this specification.

HERBERT E. SMITH.